United States Patent [19]

Paulsen

[11] Patent Number: 4,502,414
[45] Date of Patent: Mar. 5, 1985

[54] FARROWING PEN

[76] Inventor: Nick E. Paulsen, R.R. 2, Center Junction, Iowa 52212

[21] Appl. No.: 524,754

[22] Filed: Aug. 19, 1983

[51] Int. Cl.³ .............................................. A01K 1/02
[52] U.S. Cl. ........................................ 119/20; 119/98
[58] Field of Search ...................... 119/20, 98, 99, 103

[56] References Cited

U.S. PATENT DOCUMENTS

| | | | |
|---|---|---|---|
| 2,557,477 | 6/1951 | Simon | 119/98 |
| 2,576,654 | 11/1951 | Thorson | 119/99 |
| 2,713,326 | 7/1955 | Stephenson | 119/99 |
| 3,010,429 | 11/1961 | Grissom | 119/98 |
| 3,167,053 | 1/1965 | McDaniel | 119/98 |

*Primary Examiner*—Gene Mancene
*Assistant Examiner*—Kris R. Schulze
*Attorney, Agent, or Firm*—Zarley, McKee, Thomte, Voorhees & Sease

[57] ABSTRACT

A farrowing pen is provided in which the spacing between the side gates can be adjusted to accommodate various sizes of sows. A series of linkage arms connecting the side gates with the end frames of the pen permit the space between the side gates to be increased or decreased in response to rotation of a shaft mounted above the pen. A stop mechanism is provided to prevent rotation of the shaft after the side gates have been positioned at the desired width.

16 Claims, 5 Drawing Figures

FARROWING PEN

BACKGROUND OF THE INVENTION

It is generally desirable to have a farrowing pen in which the lateral width of the pen can be adjusted depending on the size of the sow that is occupying the pen. A greater width is necessary for a larger sow than a smaller sow. It is also advantageous to be able to lock the side gates of the pen so that the selected width can be maintained.

Thus, a primary objective of the present invention is the provision of a farrowing pen having an adjustable width.

A further objective of the present invention is the provision of a farrowing pen in which the side gates may be adjusted to accomodate sows of different sizes.

A further objective of the present invention is the provision of a farrowing pen in which the side gates can be locked into the desired width position.

A further objective of the present invention is the provision of a farrowing pen having a width that is simple and easy to change.

A further objective of the present invention is the provision of a farrowing pen which is comfortable for a mother sow, regardless of her size, while at the same time preventing the sow from being able to turn around within the pen.

SUMMARY OF THE INVENTION

The farrowing crate of the present invention generally has a frame at opposite ends of the stall with side gates pivotally mounted between the end frames. The spacing between the gates can be increased or decreased through a series of linkage arms attached to a rotatable elongated shaft connected to and above the stall along the longitudinal axis thereof. When the shaft is rotated clockwise, the side gates are pivoted upwardly and outwardly via the linkage arms. When the shaft is rotated counterclockwise, the side gates are pivoted downwardly and inwardly via the same linkage arms. One end of the shaft has an opening therein adapted to receive the driveshaft of a socket wrench for ease in rotating the shaft in either direction. A square nut connected to the shaft has stop members secured thereto which are engaged by stop arms to prevent rotation of the shaft in either direction.

DETAILED DESCRIPTION OF THE DRAWINGS

Figure 1:
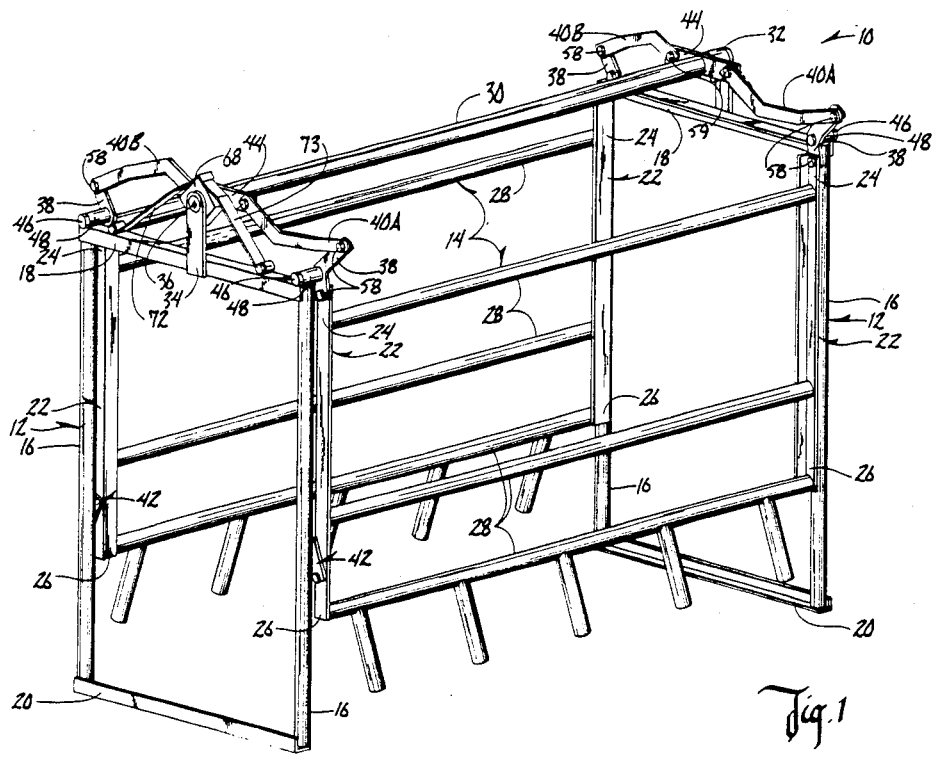
FIG. 1 is a perspective view of the farrowing pen of the present invention.
Figure 2:
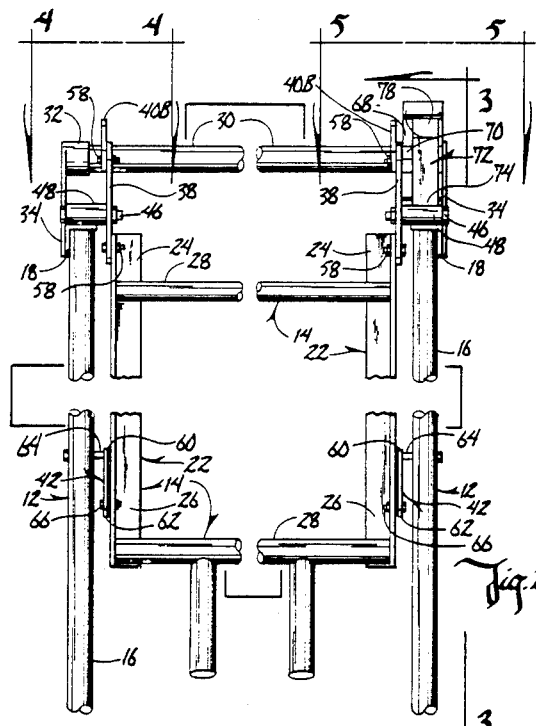
FIG. 2 is a side elevation view of the farrowing pen of the present invention.

Numeral 10 generally designates the farrowing pen of the present invention. Farrowing pen 10 includes spaced apart end frames 12 and side gates 14. Each end frame 12 has upright corner posts 16, and an upper crossbar 18 and a lower crossbar 20 innerconnecting corner posts 16. Each side gate 14 has a pair of vertical end bars 22 with an upper end 24 and a lower end 26. Each pair of bars 22 is interconnected by a plurality of horizontal crossbars 28.

The novelty of farrowing pen 10 lies in the adjustment means used to vary the spacing between side gates 14. The adjustment system utilizes a shaft 30 which, when rotated, pivots side gates 14 through a series of linkage arms so as to change the spacing between the gates. A stop means is provided to prevent rotation of shaft 30.

Shaft 30 is mounted above farrowing pen 10 along the longitudinal axis thereof. Shaft 30 is freely rotatable within a pair of collars 32, one of said collars being positioned at either end of the shaft. Each collar 32 is fixed to the upper crossbar 18 of opposite end frames 12 by a mounting bar 34. One end of shaft 30 is provided with a square hole 36 which is adapted to receive the drive shaft of a socket wrench. Shaft 30 can thus be rotated in either a clockwise or counterclockwise direction by application of an appropriate force via the socket wrench.

The linkage means which acts to vary the spacing between side gates 14 in response to rotation of shaft 30 generally includes two pairs of pivot arms 38, two pairs of arcuate arms 40A and 40B, two pairs of lower link arms 42, and a pair of horizontal bars 44. One of horizontal bars 44 is secured by welding or the like to each end of shaft 30. One of each pairs of arms 38, 40A and 40B, and 42 is utilized at each end of farrowing pen 10.

Each pivot arm 38 is pivotable about a pin 46 which is journaled within a collar 48 mounted on upper crossbar 18 of end frame 12. Each pivot arm 38 has a bend in it at the pivot point so as to define a long arm 50 and a short arm 52. Long arm 50 is approximately twice the length of short arm 52 so as to reduce the torque necessary to move side gates 14.

Each arcuate arm 40A and 40B has an outer end 54 and an inner end 56. Each outer end 54 is pivotally connected by a nut and bolt assembly 58 to the end of long arm 50 of one of the pivot arms 38. A similar nut and bolt assembly 59 is used to pivotally connect each inner end 56 of arcuate arms 40A and 40B to one end of horizontal bars 44, so that each pair of arcuate arms 40A and 40B has an inner end 56 connected to opposite ends of horizontal bars 44 at each end of shaft 30. Each arcuate arm 40A and 40B has a series of bends between outer end 54 and inner end 56 which permit each pair of arms 40A and 40B to be moved, as later described, without coming in contact with shaft 30. Each arm 40A is arranged concave up while arm 40B is arranged concave down.

Each lower link arm 42 has an upper end 60 and a lower end 62. Upper end 60 is pivotally connected to one of the upright posts 16 of end frames 12 by pin 64 extending through upright post 16. A nut and bolt assembly 66 is used to pivotally connect lower end 62 to one of the vertical end bars 22 of side gates 14.

The means utilized to prevent rotation of shaft 30 comprises a square nut 68 attached to shaft 30 near the end having square hole 36, a plurality of stop members 70 secured to three corners of square nut 68, and a pair of opposing stop arms 72 and 73. Each stop arm has a lower end 74 pivotally connected to upper crossbar 18 of end frame 12 by a nut and bolt assembly 76 and an upper end 78 which engages one of the stop members 70 so as to prevent rotation of shaft 30.

Figure 3:
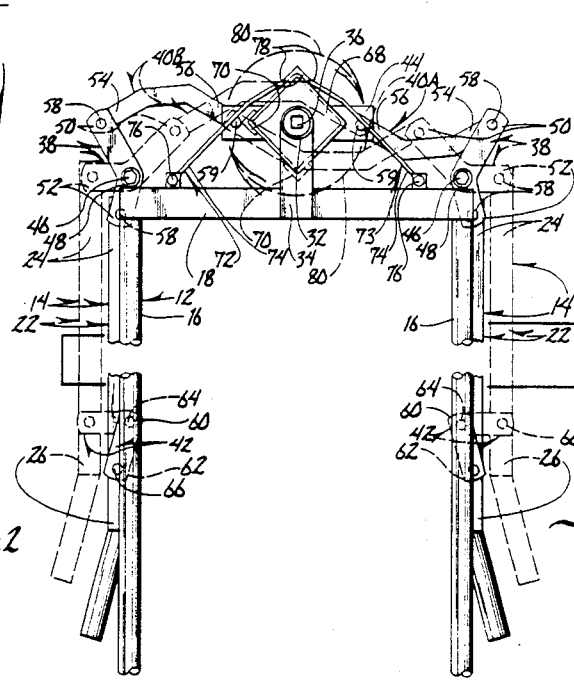
FIG. 3 is a partial front elevation view taken along line 3—3 of FIG. 2.
Figure 4:
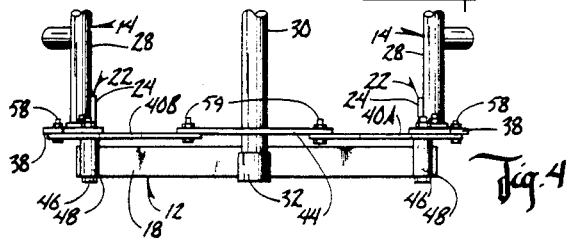
FIG. 4 is a partial top plan view taken along line 4—4 of FIG. 2.
Figure 5:
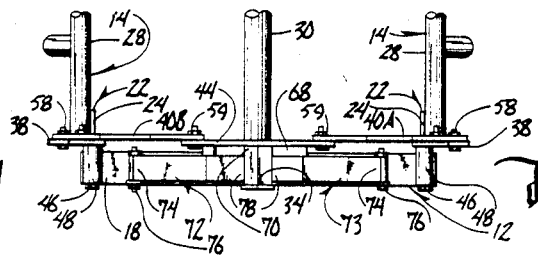
FIG. 5 is a partial top plan view taken along line 5—5 of FIG. 2.

To move side gates 14 from a first narrow position to a second wider position as indicated in the dotted lines of FIG. 3, the drive shaft of a socket wrench in inserted into square hole 36 of shaft 30. Stop arm 73 is then disengaged from stop member 70 to permit clockwise rotation of shaft 30. A clockwise force is then applied to the handle of the socket wrench so as to rotate shaft 30 in the same direction. Shaft 30 can be rotated 90° such that side gates 14 are in an intermediate position or rotation may continue 180° to place side gates 14 in the fully expanded position shown by broken lines in FIG. 3. As shaft 30 is rotated, horizontal bar 44 secured to shaft 30 is also rotated such that inner ends 56 of arcuate arms 40A and 40B are pulled in opposite directions. The bends in arcuate arms 40A and 40B permit them to pass above and below shaft 30 as they move in response to rotation of shaft 30, as illustrated in FIG. 3.

As arcuate arms 40A and 40B move in opposite directions with respect to one another, long arms 50 of pivot arms 38 are pulled towards one another as each pivot arm 38 pivots about pin 46. Accordingly, short arms 52 of pivot arms 38 move outwardly away from each other to raise upwardly and outwardly upper ends 24 of vertical end bars 22 of side gates 14. Lower end 62 of lower link arms 42 are pulled upwardly and outwardly by lower ends 26 of vertical end bars 22 of side gates 14 as lower link arms 42 pivot about pin 64.

The above described operation permits side gates 14 to be moved from a lower narrow position to a raised wider position to accomodate larger sows. Stop arm 72 permits shaft 32 to be rotated either 90° or 180° while preventing counterclockwise rotation of the shaft. Pivot arms 38 pivot approximately 75° in response to a 180° rotation of shaft 30. To move side gates 14 from the raised wider position to the lower narrower position, stop arm 72 is disengaged from stop member 70 and a counterclockwise force is applied to the handle of the socket wrench so as to rotate shaft 30 in a counterclockwise direction. Stop arm 73 prevents clockwise rotation of shaft 30. Stop arms 72 and 73 thus lock gates 14 in position and prevent movement of the sow contained within farrowing pen 10 from accidentally altering the position of side gates 14.

It can be seen that if the position of arcuate arms 40A and 40B at each end of pen 10 is reversed, shaft 30 must be rotated counterclockwise to raise and widen side gates 14 and shaft 30 must be rotated clockwise to lower side gates 14 into their narrow position. Otherwise the movement of gates 14 is identical to that previously described.

Thus, farrowing pen 10 of the present invention has side gates 14 which can be locked into position after the spacing therebetween has been adjusted to provide a comfortable stall for the sow contained in the pen. Therefore, at least all of the stated objectives are accomplished by farrowing pen 10 of the present invention.

What is claimed is:

1. A farrowing pen, comprising:
a pair of spaced apart end frames;
a pair of spaced apart side gates, each having an upper and lower edge and each side gate being pivotally connected at opposite ends to said end frames, and
an adjustment means connected to said end frames and said side gates for moving said side gates between a first narrow position and a second wide position with respect to the spacing between said gates;
said side gates being at a higher elevation with respect to said end frames when said side gates are in said second position than when said side gates are in said first position;
said adjustment means including an elongated shaft rotatably mounted at opposite ends to said end frames and having first and second opposite ends, linkage means pivotally connecting said side gates to said shaft, whereby rotation of said shaft moves said side gates between said positions and stop means for preventing rotation of said shaft.

2. A farrowing pen according to claim 1 wherein said adjustment means further comprises an opening in said first end of said shaft adapted to receive the drive connection of a wrench whereby rotatonal force applied to said wrench rotates said shaft to move said side gates between said first and second positions.

3. A farrowing pen according to claim 2 wherein said stop means comprises a square nut secured to said first end of said shaft, a stop member fastened to said square nut and a pair of opposing stop arms having one end connected to said end frame and the opposite end selectively engaging said stop member to prevent rotation of said square nut.

4. A farrowing pen according to claim 3 wherein one of said stop arms prevents clockwise rotation of said shaft and the other of said stop arms prevents counterclockwise rotation of said shaft.

5. A farrowing pen according to claim 2 wherein said linkage means comprises a pair of horizontal bars each having opposite ends, one of said bars being connected at the midpoint thereof to each end of said shaft, two pairs of arcuate arms each having spaced apart inner and outer ends, said inner ends of one of said pairs of arcuate arms being pivotally connected to said opposite ends of said horizontal bar at each end of said shaft, and two pairs of pivot arms each having opposite ends, one of said ends of each pivot arm being pivotally connected to each of said outer ends of said arcuate arms and the other of said ends of each pivot arm being pivotally connected to one of said side gates.

6. A farrowing pen according to claim 5 wherein each of said pivot arms is pivotable intermediate said opposite ends about a pin journaled within said end frame.

7. A farrowing pen according to claim 6 wherein one of said arcuate arms of each said pair of arcuate arms has a concave upper surface and the other of said arms has a convex upper surface whereupon rotation of said adjustment means pulls said arcuate arms in each pair of said arcuate arms in opposite directions without said arcuate arms contacting one another or said shaft.

8. A farrowing pen according to claim 7 whereby said rotation of said adjustment means pivots each of said pivot arms about said pin so as to simultaneously move said side gates between said first and second positions.

9. A farrowing pen according to claim 8 further comprising a set of lower link arms, each of said link arms being pivotally connected at one end to said end frame and at the other end to said lower edge of said side gate.

10. A farrowing pen according to claim 9 whereby rotation of said adjustment means moves said side gates on said lower link arms between said first and second positions with said side gates being at a lower elevation in said first position than in said second position.

11. A farrowing pen, comprising:
a pair of spaced apart end frames;
a pair of spaced apart side gates each having an upper and lower edge and each side gate being pivotally connected at opposite ends to said end frames;
an elongated shaft rotatably mounted at opposite ends to said end frames and having first and second opposite ends;
rotation means for rotating said shaft;
linkage means connected to said shaft and to said side gates for pivotally moving said side gates between a first raised position and a second lowered position in response to rotation of said shaft;
the spacing between said side gates being greater when said side gates are in said second position than when in said first position; and
stop means attached to said shaft to prevent rotation of said shaft.

12. A farrowing pen according to claim 11 wherein said linkage means comprises a pair of horizontal bars each having opposite ends, one of said bars being connected at the midpoint thereof to each end of said shaft, two pairs of link arms each having spaced apart inner and outer ends, said inner ends of one of said pairs of link arms being pivotally connected to said opposite ends of said horizontal bar at each end of said shaft, and two pairs of pivot arms each having opposite ends, one of said ends of each pivot arm being pivotally connected to each of said outer ends of said link arms and the other of said ends of each pivot arm being pivotally connected to one of said side gates.

13. A farrowing pen according to claim 12 wherein each of said pivot arms is pivotable intermediate said opposite ends about a pin journaled within said end frame.

14. A farrowing pen according to claim 13 wherein actuation of said rotation means pulls said link arms in each pair of link arms in opposite directions so as to pivot said pivot arms about said pin whereby said side gates are simultaneously moved between said first and second positions.

15. A farrowing pen according to claim 14 further comprising a second set of link arms, each of said link arms of said second set being pivotally connected at one end to said end frame and at the other end to said lower edge of said side gate whereby activation of said rotation means moves said side gates between said first and second positions with the space between said gates being greater in said second position than in said first position.

16. A farrowing crate according to claim 11 wherein said stop means includes a square nut secured to one end of said shaft, a stop member connected to said nut and a pair of opposing stop arms engaging opposite sides of said stop member to prevent clockwise or counterclockwise rotation of said shaft.

* * * * *